US010938615B2

(12) United States Patent
Ling

(10) Patent No.: US 10,938,615 B2
(45) Date of Patent: Mar. 2, 2021

(54) SIGNALING IN AN ORTHOGONAL FREQUENCY DIVISION MULTIPLEXED RADAR SYSTEM

(71) Applicant: Maxlinear, Inc., Carlsbad, CA (US)

(72) Inventor: Curtis Ling, Carlsbad, CA (US)

(73) Assignee: MaxLinear, Inc., Carlsbad, CA (US)

(*) Notice: Subject to any disclaimer, the term of this patent is extended or adjusted under 35 U.S.C. 154(b) by 149 days.

(21) Appl. No.: 16/372,587

(22) Filed: Apr. 2, 2019

(65) Prior Publication Data

US 2019/0305999 A1    Oct. 3, 2019

Related U.S. Application Data

(60) Provisional application No. 62/651,351, filed on Apr. 2, 2018.

(51) Int. Cl.
*H04L 27/26* (2006.01)
*G01S 13/89* (2006.01)
*G01S 13/76* (2006.01)
*H01Q 3/34* (2006.01)

(52) U.S. Cl.
CPC .......... *H04L 27/2666* (2013.01); *G01S 13/76* (2013.01); *G01S 13/89* (2013.01); *H01Q 3/34* (2013.01)

(58) Field of Classification Search
CPC .............. H04L 25/0224; H04L 27/261; H04L 27/2666; G01S 13/76; G01S 13/87; G01S 13/89
See application file for complete search history.

(56) References Cited

U.S. PATENT DOCUMENTS

| 10,126,421 | B2  | 11/2018 | Ling |
|---|---|---|---|
| 10,162,053 | B2  | 12/2018 | Ling |
| 10,175,352 | B2  | 1/2019  | Ling |
| 10,324,179 | B2  | 6/2019  | Ling et al. |
| 2008/0018521 | A1* | 1/2008 | Sahinoglu ............... G01S 7/28 342/27 |
| 2015/0198702 | A1* | 7/2015 | Kim .................. G01S 13/0209 342/21 |

(Continued)

OTHER PUBLICATIONS

U.S. Appl. No. 16/372,595, filed Apr. 2, 2019.
U.S. Appl. No. 16/372,600, filed Apr. 2, 2019.

*Primary Examiner* — Khaled M Kassim
(74) *Attorney, Agent, or Firm* — Maschoff Brennan

(57) ABSTRACT

A transmitter of a radar system repeatedly transmits a first OFDM symbol into a scene to be characterized during a first time interval, and repeatedly transmits, during a second time interval that occurs after the first time interval, a second OFDM symbol into the scene. A receiver of the radar system generates a first channel response estimate for a first section of the scene based on: received reflections of the first symbol, at least one of which was received during transmission of the second OFDM symbol in the second time interval, and a first channel response estimate for a second section of the scene based on the first channel response estimate for the first section of the scene, received reflections of the first symbol, and received reflections of the second symbol. The receiver detects objects present in the scene based on the first channel response estimate for the first section of the scene and the first channel response estimate for the second section of the scene.

20 Claims, 16 Drawing Sheets

(56) References Cited

U.S. PATENT DOCUMENTS

| | | | |
|---|---|---|---|
| 2015/0355320 A1* | 12/2015 | Kim | G01S 13/885 |
| | | | 342/21 |
| 2016/0349365 A1 | 12/2016 | Ling | |
| 2016/0356885 A1* | 12/2016 | Hakobyan | G01S 13/931 |
| 2017/0310758 A1* | 10/2017 | Davis | G01S 13/931 |
| 2019/0302229 A1* | 10/2019 | Ling | G01S 13/876 |
| 2019/0317203 A1* | 10/2019 | Rosson | G01S 7/4021 |
| 2019/0339355 A1* | 11/2019 | Nosthoff | G01S 5/04 |
| 2019/0353768 A1* | 11/2019 | Hoshuyama | G01S 7/023 |
| 2019/0391246 A1* | 12/2019 | Dammert | G01S 13/931 |
| 2020/0169362 A1* | 5/2020 | Altintas | H04L 5/0048 |

\* cited by examiner

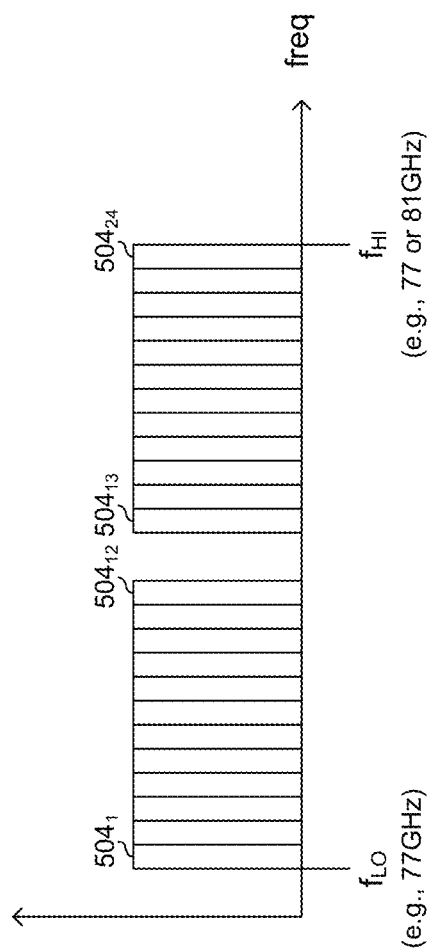

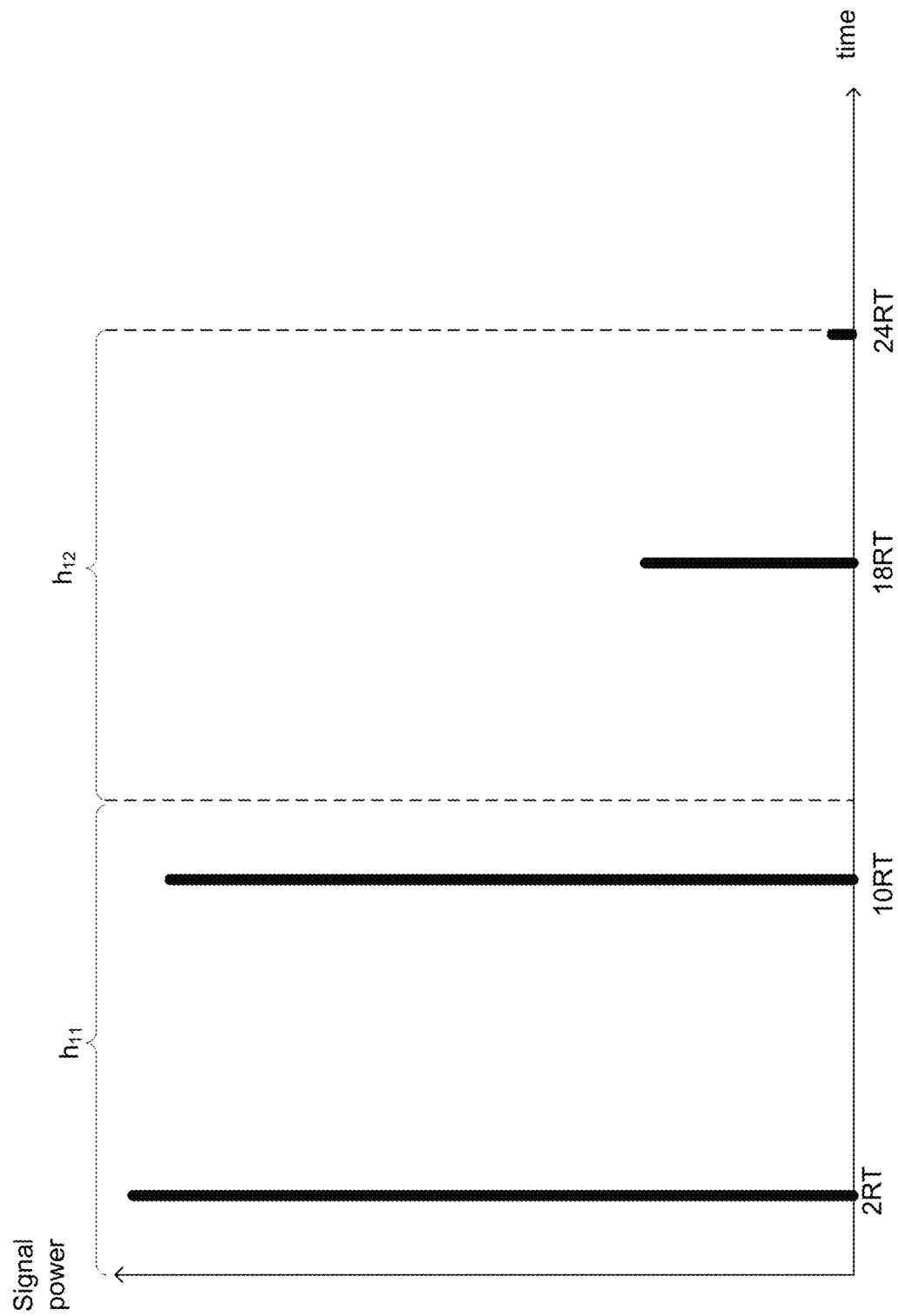

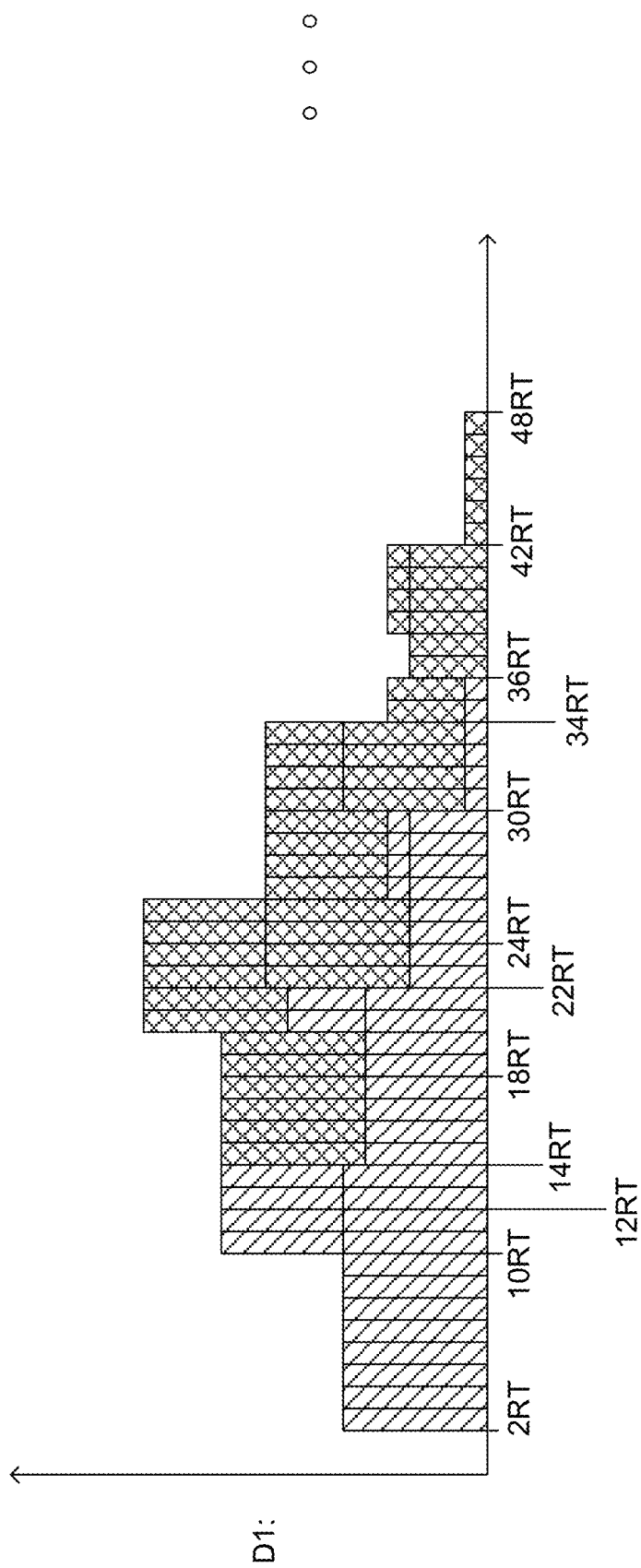

US 10,938,615 B2

SIGNALING IN AN ORTHOGONAL FREQUENCY DIVISION MULTIPLEXED RADAR SYSTEM

PRIORITY CLAIM

This application claims priority to U.S. provisional application 62/651,351 titled "Signaling in an Orthogonal Frequency Division Multiplexed Radar System" and filed on Apr. 2, 2018, the entirety of which is hereby incorporated herein by reference in its entirety.

BACKGROUND

Limitations and disadvantages of conventional radar systems and methods of their use will become apparent to one of skill in the art, through comparison of such approaches with some aspects of the present method and system set forth in the remainder of this disclosure with reference to the drawings.

BRIEF SUMMARY

Methods and systems are provided for signaling in an OFDM Radar System, substantially as illustrated by and/or described in connection with at least one of the figures, as set forth more completely in the claims.

BRIEF DESCRIPTION OF THE DRAWINGS

FIG. 5A shows an example OFDM frame transmitted by a phased array radar system in accordance with an example implementation of this disclosure.

FIG. 5C shows the channel response of the scene of FIG. 5B.

FIG. 5E shows the radar returns of the signal of FIG. 5D transmitted into the scene of FIG. 5B.

DETAILED DESCRIPTION

Figure 1A:
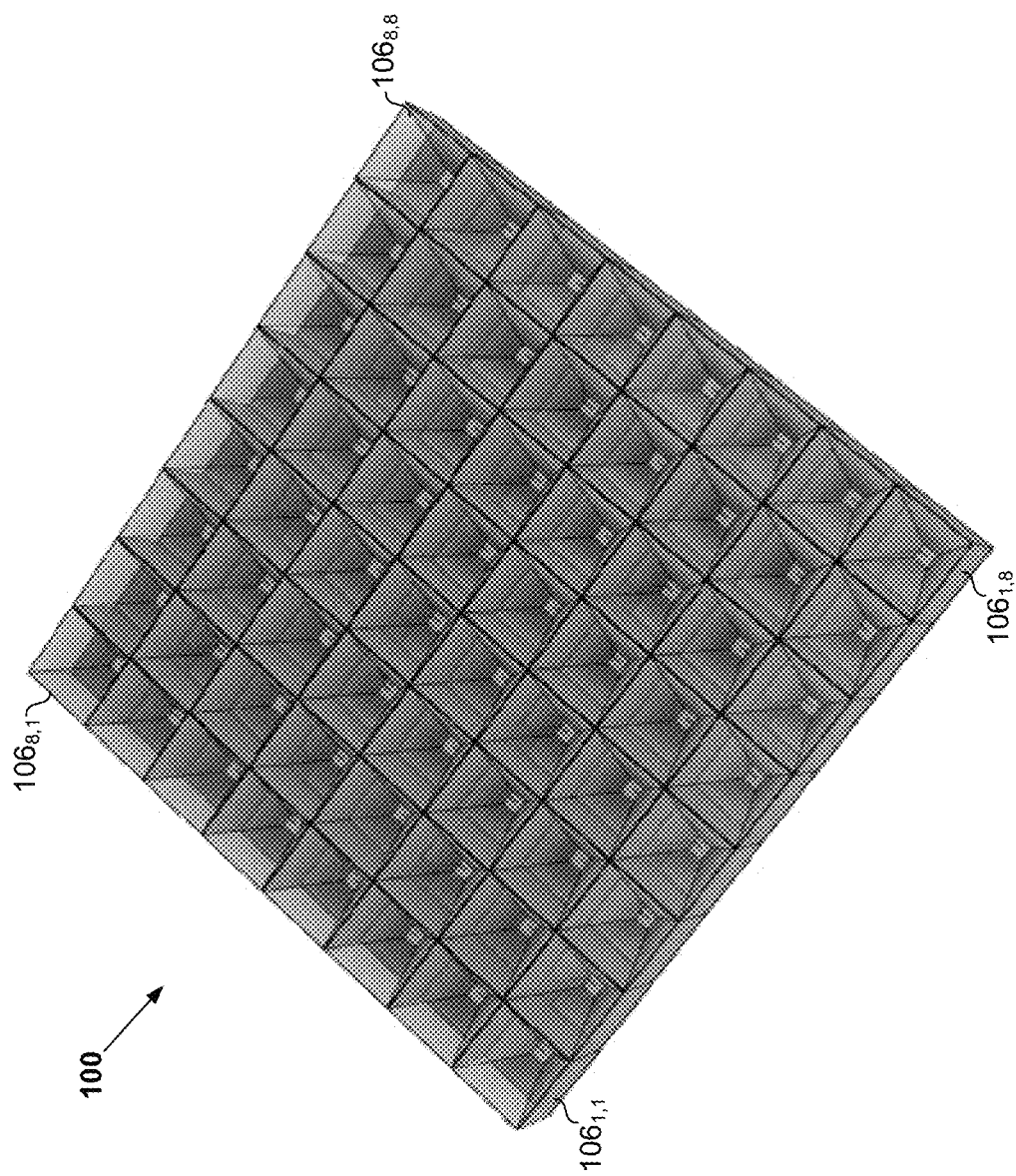
FIGS. 1A-1C show an example phased array system in accordance with an example implementation of this disclosure.
Figure 1B:
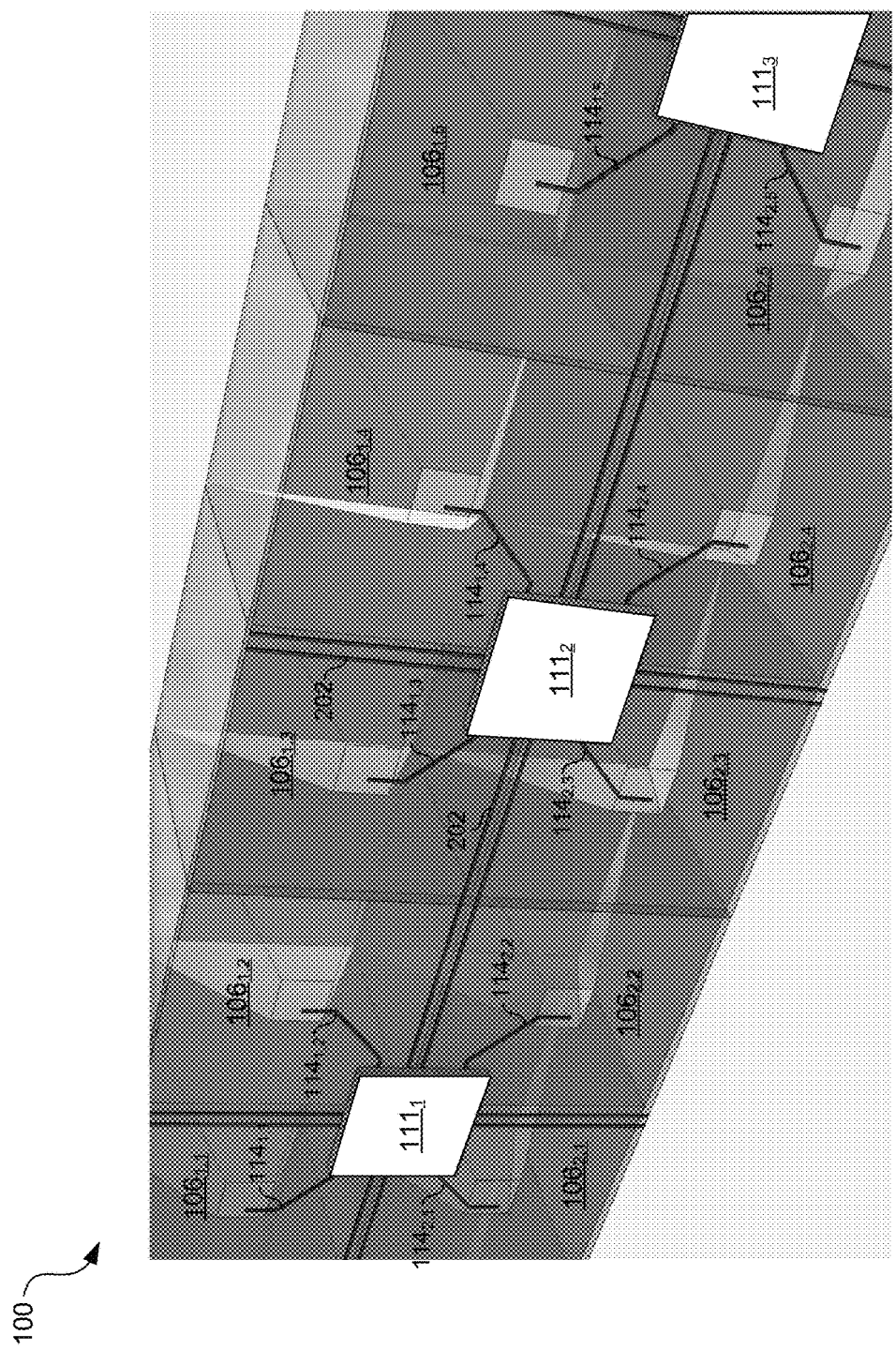
Figure 1C:
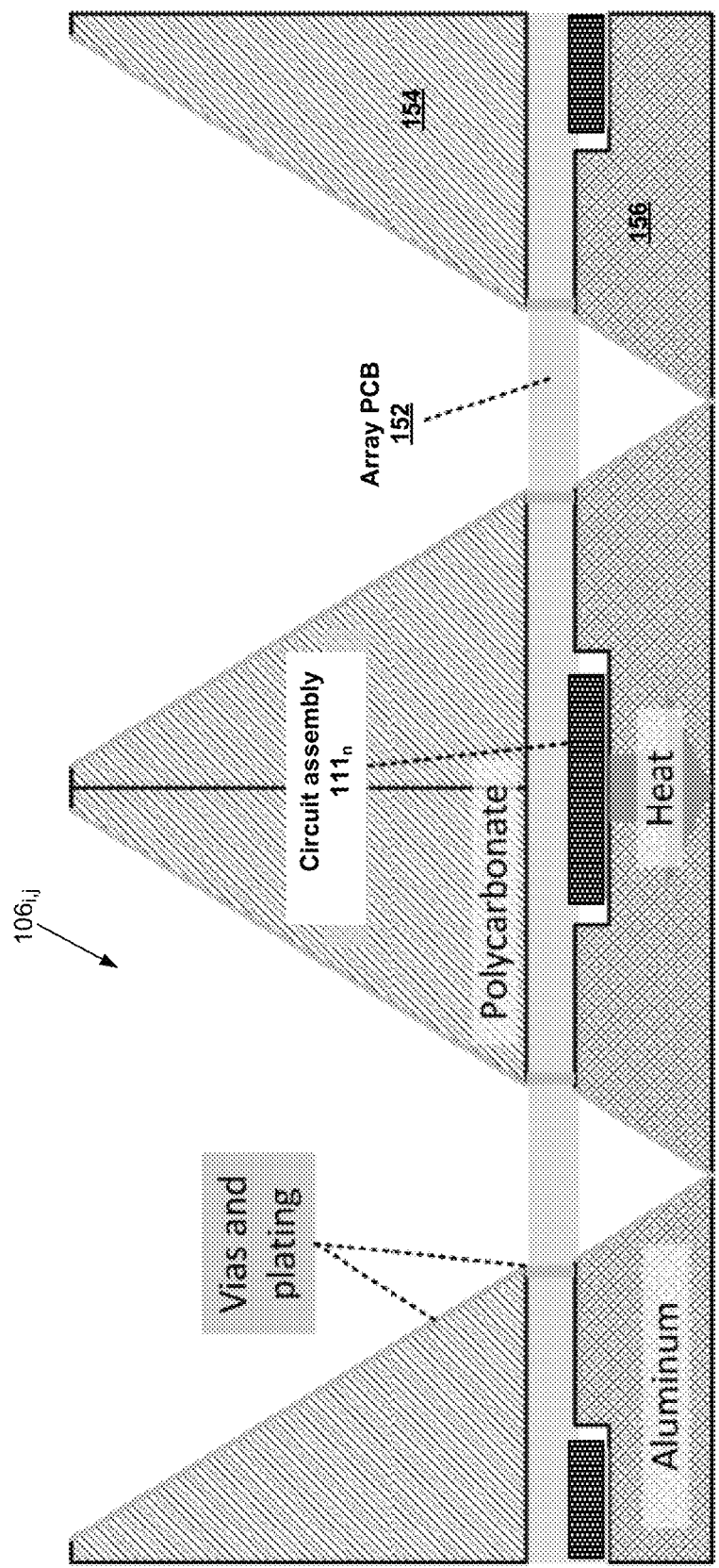

FIG. 1A-1C illustrate an example phased array system 100. FIG. 1A shows a front view and FIG. 1B shows a rear view.

The phased array system 100 comprises a plurality of antenna element elements arranged in a 2-dimensional array. Each antenna element is called out as $106_{i,j}$, where i is an integer corresponding to the antenna element's row index in the array ($0<=i<=I$) and j is an integer corresponding to the antenna element's column index in the array ($0<=j<=J$). In the example shown there are 8 antenna elements in each row and 8 antenna elements in each column, (i.e., I=8 and J=8), but in practice any number of antenna elements may be used. The transmission and reception of signals by the system 100 may take advantage of beamforming and may be particularly configured for addressing possible issues (interference, etc.) and/or to provide added features, as described below.

The example phased array system 100 of FIGS. 1A-1C comprises an array of N antenna element elements 106 (e.g., N=64 elements, in 8×8 arrangement, as shown in the non-limiting example implementation illustrated in FIG. 1A), and one or more circuits 111, coupled to the antenna elements via antenna feeds 114, for handling and/or supporting transmission and reception of signals via the array of antenna element elements 106. The circuits 111 are operable to perform various signal processing related functions, as well as (optionally) other functions (e.g., control, storage, etc.) in support of the transmission and reception of signals via the antenna elements 106. In the example implementation shown, the system 100 comprises N (an integer) circuit assemblies $111_n$ ($1<=n<=N$), each of which is operable to transmit and/or receive via a respective M (an integer) of the antenna elements 106 (N=16 and M=4 in the example shown).

As shown in the example implementation of FIG. 1C, antenna elements 106, of which two elements are shown in the cross-section slice depicted in FIG. 1C, the antenna elements 106 may be formed using carved horn structure 154, which may comprise polycarbonate (or other suitable material) substrate with conductive plating (e.g., aluminum) covering the surfaces forming the horn-shaped antenna elements. The antenna elements 106 may be mounted to a rigid base structure 156 (e.g., made of aluminum). In between the base structure 156 and the horn structure 154 may be one or more printed circuit board (PCB) 152 that provides RF traces interconnecting the circuit assemblies 111 and the antenna elements 106.

Phased array systems, such as the phased array system 100, offer various advantages and/or improvements over conventional antenna systems, such as dish-based designs. In this regard, because of their light weight, small form factor, and use of beam steering (e.g., beamforming), phased array systems are preferable over traditional dish-based designs. The elimination of dish and related components (e.g., the frequency duplexer, large power amplifier ("PA"), etc.) allows for installation at a wider range of sites, with lower cost of installation and operation (e.g., automatic alignment). Accordingly, phased array systems may be installed in a more flexible manner compared to dish-based designs, allowing installation options not possible or practical with traditional designs—e.g., mounting to sides of buildings, etc.

Phased array systems may have lower costs (e.g., fewer, smaller, and less expensive circuits, etc.). Also, the use of software-defined multiband array operation adds more flexibility. For example, the elimination of certain components (e.g., duplexers) allows the array-based systems to operate across a wide frequency range. Greater link reach may be achieved for the same dish size (due to, e.g., greater transmitter power, interference suppression, etc.). Operations may be improved (e.g., lower operating expenditures, greater frequency reuse, lower weight, etc.). Further, phased array systems may have superior thermal dissipation characteristics. In addition, the same core technology may be used for different interfaces and/or frequencies bands, allowing for common software and hardware development.

Figure 2A:
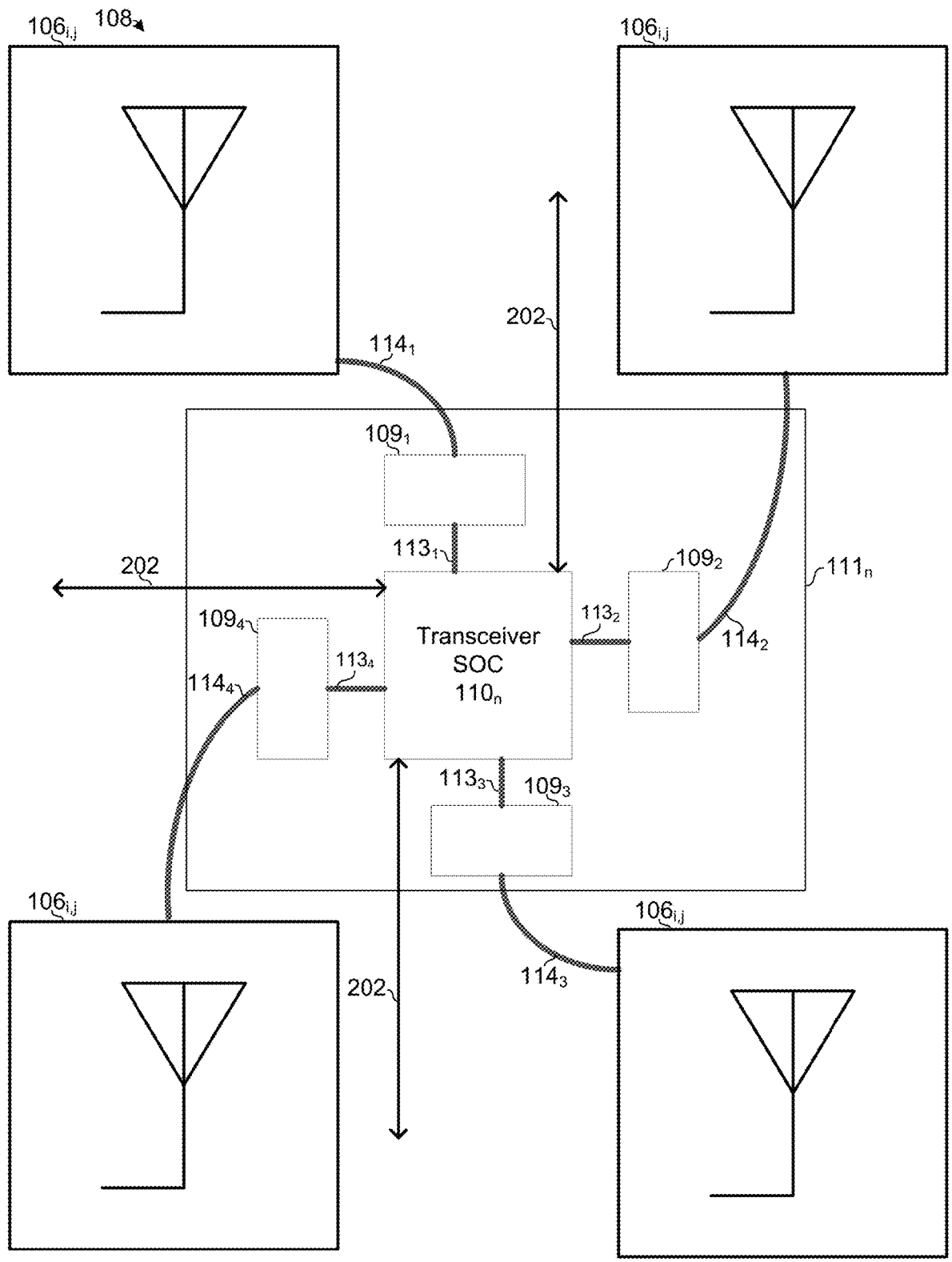
FIGS. 2A and 2B show an architecture of a phased array transceiver system in accordance with an example implementation of this disclosure.
Figure 2B:
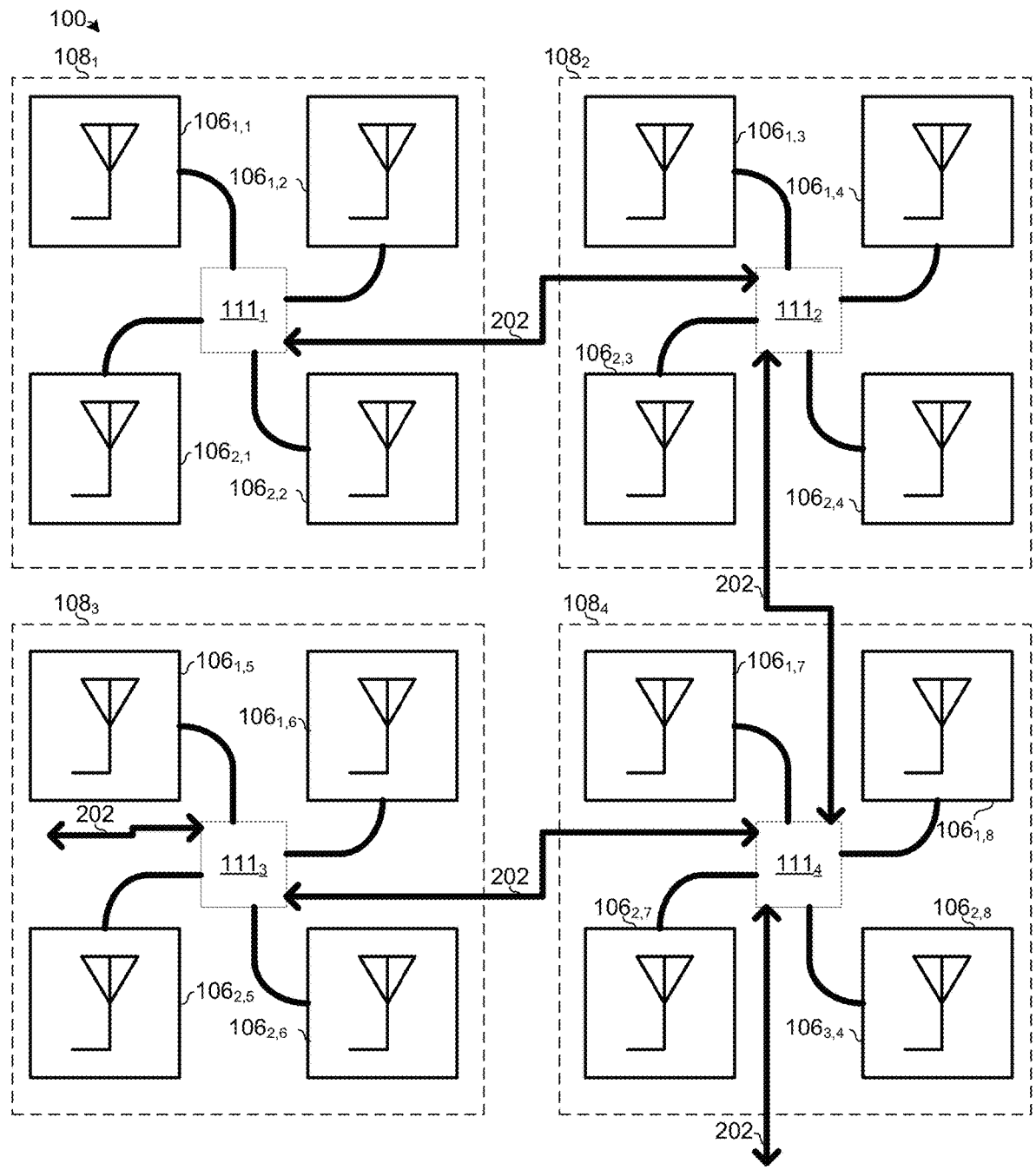

FIGS. 2A and 2B show an example architecture of a phased array transceiver system. In the example implementation of FIGS. 2A and 2B, each circuit assembly $111_n$ comprises a highly-integrated transceiver system on chip $110_n$ and a plurality of off-chip circuits $109_m$, each of the circuits $109m$ being associated with a respective one of the M antenna elements 106 via which the circuit assembly $110_n$ transmits and/or receives. An example implementation of the SoC $110_n$ is described below with reference to FIG. 2C. An example implementation of the circuits 109 is described below with reference to FIG. 2C. The N SoCs $110_1$-$110_N$ are interconnected via interconnect 202, which may, for example, comprise a high-speed serial bus via which the SoCs $110_1$-$110_N$ can exchange data and control signaling.

In an example implementation, each circuit 111 is operable to: (1) transmit, in one or more desired directions using beamforming, millimeter wave signals (e.g., in the 76 to 81 GHz band) via its antenna elements 106; (2) receive reflections of the transmitted signal, from one or more desired directions using beamforming; and (3) process the received reflections to generate a representation of the "scene" on which the signals are incident. For example, the scene representation may be a voxel grid, with each voxel corresponding to a particular location in 4-Dimensional space (e.g., its GPS coordinates and time at which the coordinates were measured). Also, each voxel may have additional information associated with it such as, for example, a strength of the reflection, a spectrum of the reflection, a velocity of an object (e.g., car, pedestrian, etc.) located at the voxel, and/or a material composition (e.g., a quantification of how hard or soft) of an object located at the voxel.

Figure 2C:
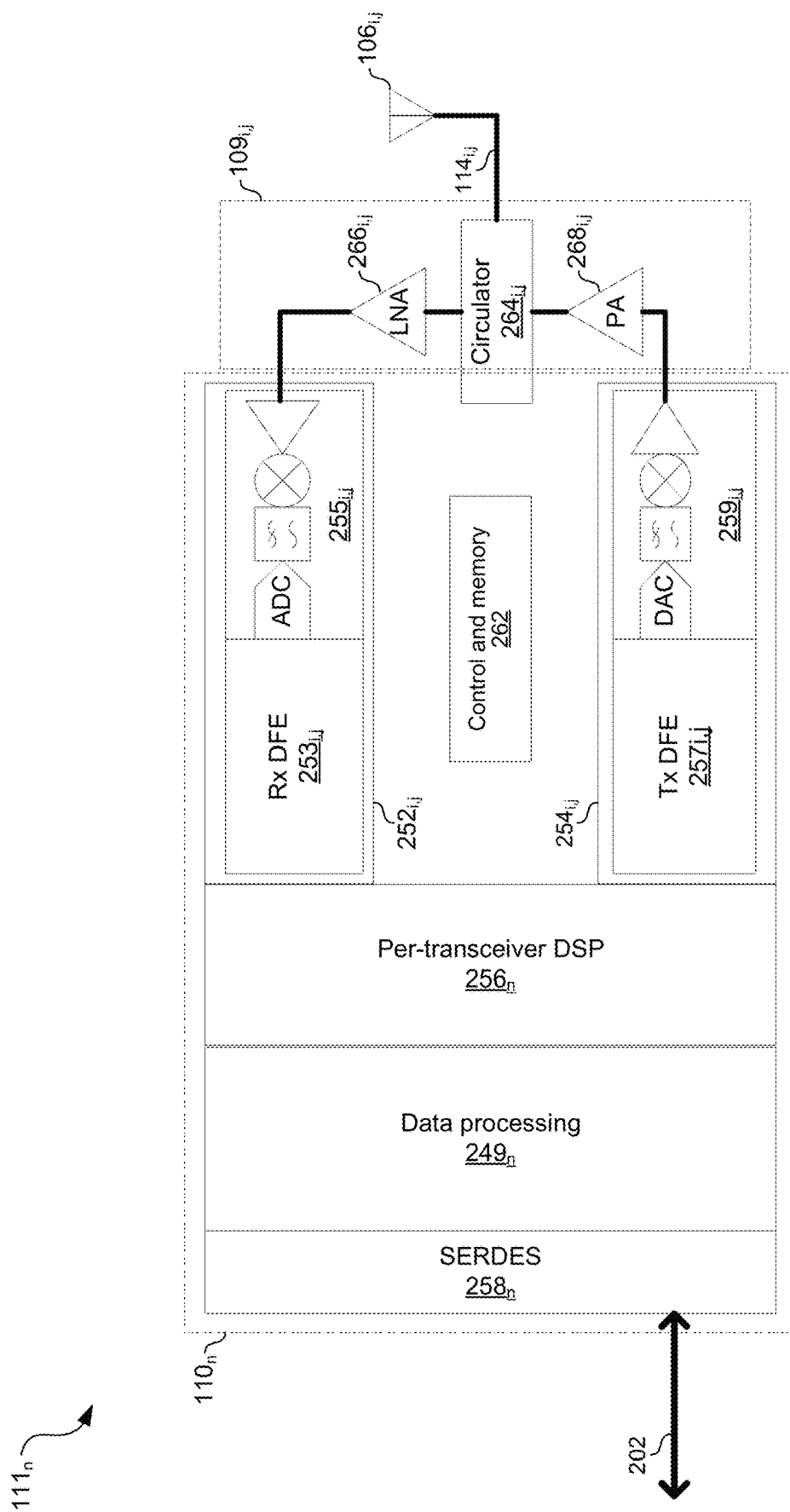
FIG. 2C shows an example implementation of a transceiver system on chip (SoC) suitable for use in a phased array radar system in accordance with an example implementation of this disclosure.

Shown in FIG. 2C are details of an example implementation of the SoC $110_n$ and a circuit $109_{i,j}$. In an example implementation, the SoC $110_n$ is a CMOS device and the LNA $266_{i,j}$ and PA $268_{i,j}$ are PHEMT devices. In other example implementations, one or more components of the circuits $109_{i,j}$ may be integrated on the CMOS chip $110_n$.

The example SoC $110_n$ comprises serialization and deserialization (SERDES) circuitry 258, per-transceiver digital signal processing (DSP) circuitry 256, one or more receive front-end circuits $252_{i,j}$, one or more transmit front-end circuits $254_{i,j}$, and a portion of one or more (four, in an example implementation) circulator $264_{i,j}$. Although only one receive front-end circuit $252_{i,j}$ and one transmit front-end circuit $254_{i,j}$ are shown for simplicity of illustration, the SoC $110_n$ may comprise any number of instances of these circuits. In the example implementations of FIGS. 1A, 1B, 2A, and 2B, for example, the SoC $110_n$ may comprise four instances of receive front-end circuit $252_{i,j}$—one for each of the four antenna elements $106_{i,j}$ via which the SoC $110_n$ receives, and four instances of transmit front-end circuit $254_{i,j}$—one for each of the four antenna elements $106_{i,j}$ via which the SoC $110_n$ transmits.

The example circuit $109_{i,j}$ comprises a low-noise amplifier $266_{i,j}$, a power amplifier $268_{i,j}$, and a portion of the circulator $264_{i,j}$. Although only one circuit $109_{i,j}$ is shown for simplicity of illustration, the circuit assembly $111_n$ may comprise any number of instances of this circuits. In the example implementations of FIGS. 1A, 1B, 2A, and 2B, for example, the circuit assembly $111_n$ may comprise four instances—one for each antenna $106_{i,j}$ via which the SoC $110_n$ transmits and/or receives.

Each of the receive front-end circuits $252_{i,j}$ comprises an analog front-end circuitry (AFE) $255_{i,j}$ and a digital front-end circuit (DFE) $253_{i,j}$ operable to process a millimeter wave signal (e.g., in the band from 76 to 81 GHz) from antenna elements $106_{i,j}$.

The processing by AFE $255_{1,d}$ may comprise, for example, low noise amplification, down-conversion, filtering, and analog-to-digital conversion by the AFE $255_{i,j}$ so as to output an intermediate frequency or digital baseband signal to the DFE $253_{i,j}$. For example, each Rx AFE 252 may downconvert a received 76 to 77 GHz band to a 1-GHz-wide baseband signal which the corresponding ADC 254 may then digitize to generate a 1-GHz-wide digital signal. As another example, each Rx AFE 252 may downconvert a received 76 to 81 GHz band to a 5 GHz wide baseband signal which the corresponding ADC 254 may then digitize to generate a 5-GHz-wide digital signal.

The processing by DFE $253_{i,j}$, may comprise, for example, channel estimation and equalization.

For received signals, the DSP circuit $256_n$ is operable to process the digitized signals from the plurality of DFEs $253_{i,j}$ to recover information conveyed by the received signals. Such information may be conveyed by characteristics (e.g., latency, Doppler shift, signal strength, etc.) of the received signals, as is the case in a conventional radar system, and/or may be data that was modulated onto the received signals. In an example implementation in which the millimeter wave signals are modulated by a data signal, the processing performed by the digital signal processing circuit $256_n$ may include demodulation. For example, the millimeter wave signals transmitted by transceivers 110 may comprise OFDM frames and each digital signal processing circuit $256_n$ may be operable to demodulate the received signals using a discrete Fourier transform. The digital signal processing circuit $256_n$ may then be operable to demap the modulated signal according to one or more symbol constellations, deinterleave the demapped bits, and decode the demapped bits. The recovered bits may then be provided to the control and memory subsystem 262 and/or to SERDES $258_{i,j}$ for output onto the bus 212.

Received signal processing by DSP $256_n$ may comprise, for example, applying a determined phase shift to the signals received from each DFE $253_{i,j}$ and then combining the signals so as to achieve the desired beamforming. The beamforming may comprise time-domain beamforming in which one or more sets of phase and amplitude coefficients is applied to each of the signals 255 in the time domain. Alternatively, or additionally, the beamforming may comprise frequency-domain beamforming in which the signals 255 are first transformed to the frequency domain (e.g., via a DFT) and then each subband (e.g., each OFDM bin or group of OFDM bins) is processed using a corresponding one or more beamforming matrices determined for that subband. In this manner, different subbands may be communicated on beams pointed in different directions.

Received signal processing performed by the digital signal processing circuit $256_n$ may comprise spectral analysis of the received signals. The spectral analysis may comprise, for example, mixing received signals with one or more reference signals to generate a difference signal. The spectral analysis may comprise, for example, performing a discrete Fourier transform on received signals. The spectral analysis may be used to, for example, determine Doppler shift of received signals and/or to generate spectral signatures of detected objects in the scene (i.e., objects off of which the received signals reflected).

Received signal processing performed by the digital signal processing circuit 256 may comprise separating different signals (e.g., originating from different ones of the transceivers $111_1$-$111_N$). The may comprise, for example, correlating the received signals with different orthogonal codes and/or pseudorandom sequences used by different ones of the SoCs $111_1$-$111_N$. Alternatively, or additionally, separating different transmitted signals (e.g., to determine which transceiver $111_n$ sent which signal) may comprise directly recovering a respective identifier (e.g., a unique identifier such as a MAC address or similar) modulated onto each of the millimeter wave signals. The ability to distinguish which, if any, energy arrived from each SoCs $111_1$-$111_N$ may be useful for performing radar, positioning, and communication functions. For the radar and positioning functions, for example, the identification of which of transceivers $111_1$-$111_N$ sent any particular received signal may be used for determining the position and angle from which the signal was transmitted (since the different transceivers $111_1$-$111_8$ are at different positions in the array 100), which may be used for determining precise distance to, and location of, objects in the scene. For the communication function, for example, the identification of which of transceivers $111_1$-$111_N$ sent any particular received signal may be used in a manner similar to a "from" address in many networking protocols.

The data processing circuitry $249_n$ is operable to process data output by the digital signal processing circuitry $256_n$. Such processing may comprise, for example, implementing algorithms to generate a representation of the scene detected using the radar function. Based on the angle, strength, timing, spectral content, and/or other characteristics of the received signals, the data processing circuitry $249_n$ may generate a 2D pixel grid or 3D voxel grid. In an example implementation, each pixel or voxel may indicate an absolute position to which it corresponds, the strength of returns, if any, received from that location, spectral content of returns, if any, received from that location, time(s) at which returns were received from that location, and/or at which the pixel or voxel data was updated.

The data processing circuitry $249_n$ may also be operable to process data received from the data bus 202. For example, positioning information may be received via the bus 202 (e.g., GPS coordinates from a GPS receiver) and combined with data recovered from the digital processing circuitry $249_n$ for performing a positioning function.

The processing performed by data processing circuitry $249_n$ of data output by digital signal processing circuitry 256 may comprise, for example, preparing data for output onto the data bus 202. For example, a scene representation generated from the output of the digital signal processing circuity 256 may be transmitted onto the data bus 202.

Each of the Tx AFEs $259_{i,j}$ is operable to receive a digital baseband signal from Tx DFE $257_{i,j}$, convert the signal to analog, upconvert the signal to a millimeter wave (e.g., a 1 GHz to 5 GHz wide signal in the band from 76 to 81 GHz), and amplify the millimeter wave signal for output to antenna element $106_{i,j}$.

For transmit, the digital signal processing circuitry $256_n$ is operable to process one or more data streams from data processing circuitry $249_n$ to generate a plurality (four in the example shown) of digital baseband signals. Transmit processing performed by digital signal processing circuitry $256_n$ may comprise, for example, encoding, interleaving, bit-to-symbol mapping, frequency mapping (mapping of symbols to subbands), modulation (e.g., using discrete Fourier transform and/or inverse discrete Fourier transform) beamforming, and/or the like.

The transmit processing performed by the digital signal processing circuit $256_n$ may comprise generating modulated signals to be modulated onto one or more carriers. For example, the digital signal processing circuit $256_n$ may output an OFDM signal.

The transmit processing performed by the digital signal processing circuit $256_n$ may comprise beamforming. The beamforming may comprise time-domain beamforming and/or frequency-domain beamforming.

Transmit operations performed by the data processing circuit $249_n$ may comprise generating one or more data signals for modulation onto the millimeter wave signals transmitted by the circuit assembly $111_n$. The datastreams may, for example, be read from memory of the circuit assembly $111_n$ (e.g., an identifier of the module $111_n$) and/or generated algorithmically (e.g., timestamps generated based on a clock of the control portion of subsystem 262). Additionally, or alternatively, the data may be received from bus 202 via bus controller $258_n$. The data processing circuit $249_n$ may packetize and/or otherwise format the data.

The bus controller circuitry $258_n$ is operable to relay data between the data bus 202 and the circuitry of the SoC $110_n$. The bus 202 may, for example, be a high speed serial bus in which case the bus controller circuitry $258_n$ is operable to perform serialization and deserialization for communicating over the bus 202.

The control portion of subsystem 262 is operable to manage operations of the circuit assembly $111_n$ (e.g., implement a state machine and/or other control logic that controls the configuration of the other components of the circuit assembly $111_n$). The control portion of subsystem 262 may, for example, configure beamforming matrices used by the digital signal processing circuitry $256_n$. For example, the control portion of subsystem 262 may determine that particular directions are of interest at a given time and may configure the beamforming to point beams in those particular directions. Particular directions may be of interest because, for example, it is desired to determine more information about objects located in that direction and/or to listen for communications that are expected to come from that direction. Directions of interest may be determined based on, for example, data received via the data bus 202, data carried in previously received millimeter wave signals, and/or scene representations generated from previously received signal reflections.

The memory portion of subsystem 262 is operable to store relatively large amounts (e.g., hundreds of megabits) of information of a variety of forms. For example, beamforming matrices, an identifier of the circuit assembly $111_n$, scrambling codes, and messages received from and/or to be communicated to (via data bus 202 and/or via millimeter wave signals) other circuit assembly $111_n$ are just some examples of the information which may be stored in the memory and readily accessible to the circuit assembly $111_n$.

Figure 3:
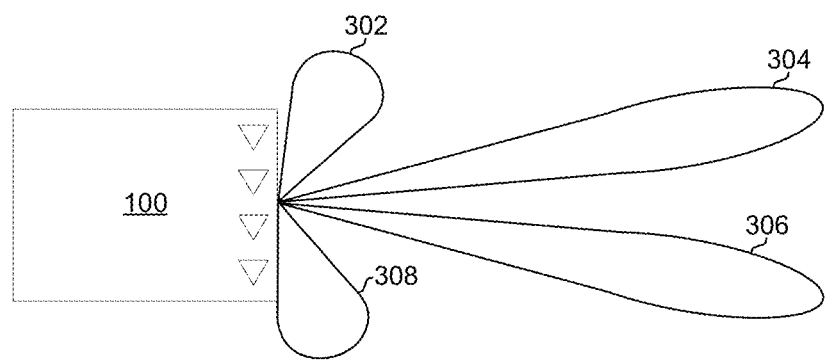
FIG. 3 shows an example antenna pattern of phased array radar system in accordance with an example implementation of this disclosure.

FIG. 3 shows an example antenna pattern of phased array radar system. In the example shown, for desired lobes—302, 304, 306, and 308 are formed. For example, lobes 302 and 308 may be used for identifying objects that are relatively close and off to the side of the phased array system 100, and the lobes 304 and 306 may be used for looking further in the distance (e.g., in the direction of travel of automobile to which the phased array is mounted). As another example, the lobes 302 and 308 may receive returns from the nearby road surface and the Doppler of such returns may be used for calculating the speed of the phased array (i.e., of the automobile to which it is mounted). As another example, lobes 302 and 308 may be used for directly communicating with another phased array system 100 off to the side of the depicted phased array system 100 (e.g., where multiple phased arrays system 100 are mounted to a single vehicle), and lobes 304 and 306 may be used for communicating with other transceivers by bouncing the signals off of objects in the scene.

Although four beams/lobes are shown for illustration, the phased array radar system is not limited to any particular number of beams/lobes. There may be different numbers of beams at different times based on, for example, the number of objects and/or angles of objects it is determined necessary or desirable to identify or track at any given time. There may be different numbers of beams at different times based on, for example, number and/or location of other transceivers with which it is necessary or desirable to communicate at any given time. Similarly, the directions of the beams may vary over time. For example, the directionality of any one or more of the beams 302, 304, 306, and 308 may change periodically, based on what is detected in the scene, based on desired communication to be sent or received, and/or the like.

Figure 4A:
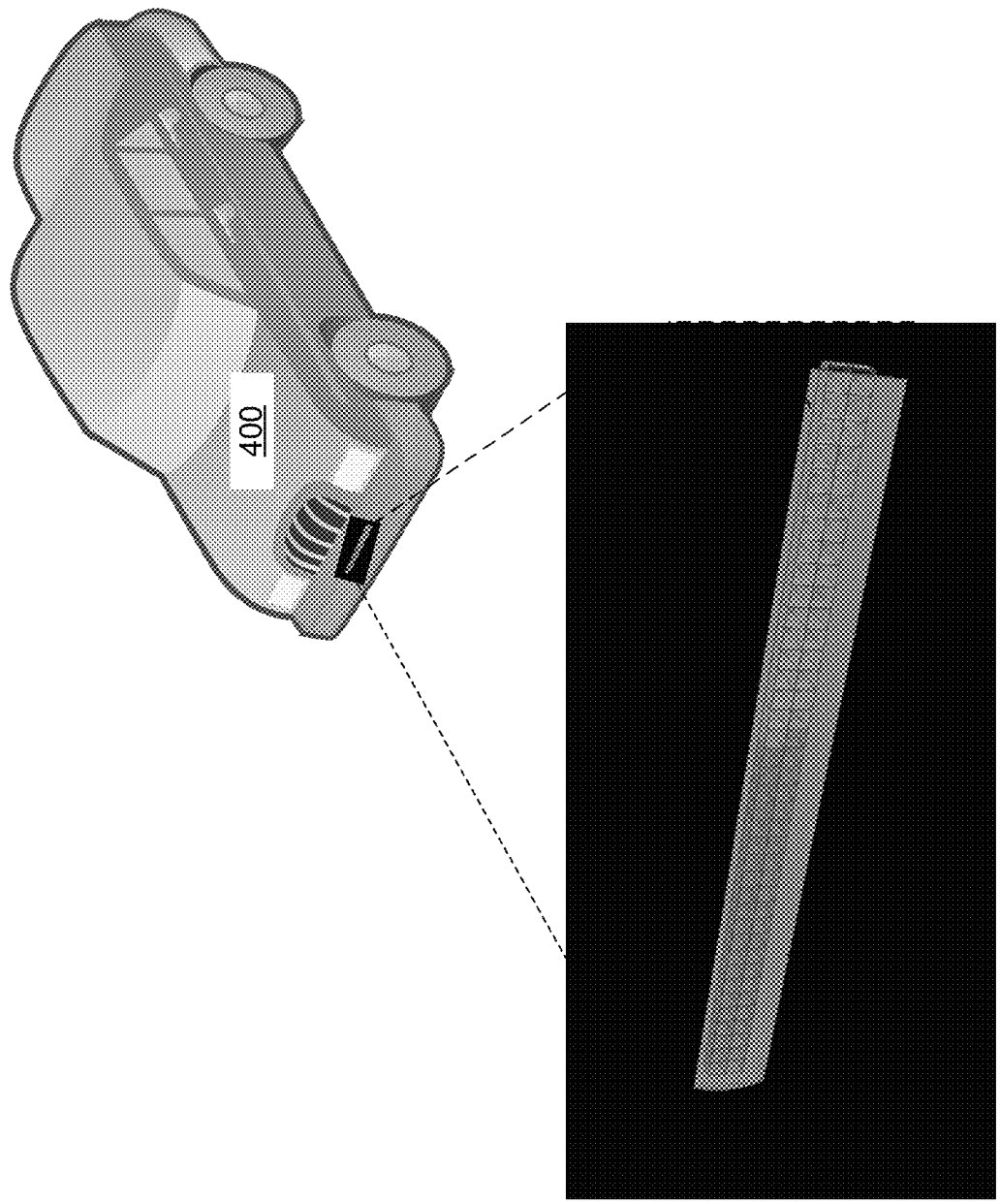
FIG. 4A shows an example phased array radar system integrated into an automobile in accordance with an example implementation of this disclosure.

FIG. 4A shows an example phased array radar system integrated into an automobile. A 2×64 element antenna array is placed in/behind the bumper of the automobile 400. In the example implementation the array comprises a lens 402 that further controls the directionality of the antenna.

Figure 4B:
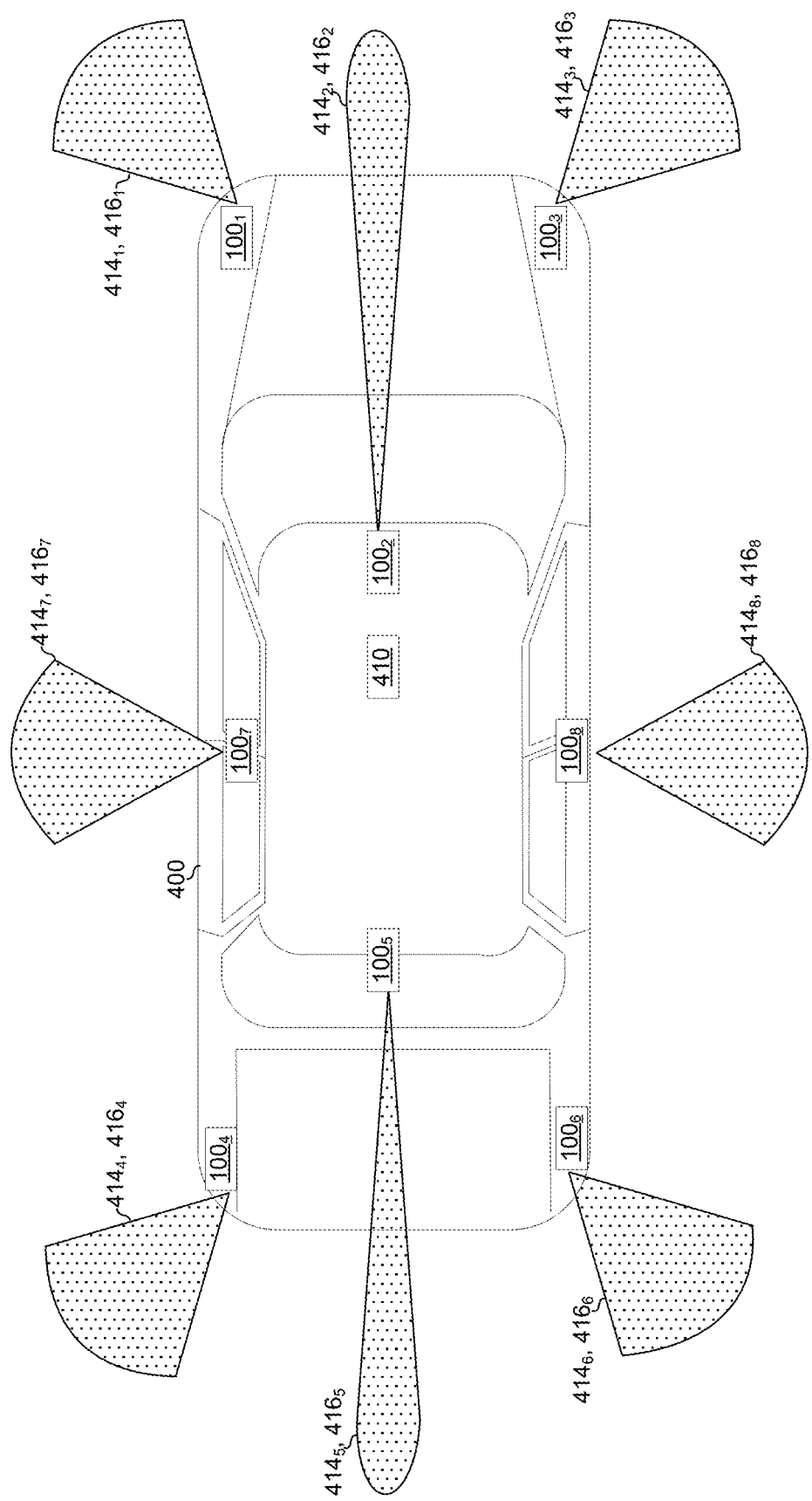
FIG. 4B shows an automobile comprising a plurality of phased array radar systems in accordance with an example implementation of this disclosure.

FIG. 4B shows an automobile 400 comprising a plurality of phased array radar systems 100 (labeled with subscripts '1' through '8'). Although the example automobile 400 comprises eight phased array radar systems 100 for illustration, any number may be present. Each phased array radar system 100 has a corresponding receive antenna pattern 414 and transmit antenna pattern 416 (for clarity of illustration, the transmit and receive patterns are shown as the same, but they need not be). Each phased array radar system 100 may perform: (1) a radar function, (2) a positioning function, and (3) a communication function.

The radar function comprises transmitting millimeter wave signals and processing the reflections/returns of such signals to detect the presence of, identity of, direction of, distance to, and/or speed of objects in the environment surrounding the automobile 400 (the "scene").

The positioning function comprises use of the same millimeter wave signals used for the radar function to improve upon coarse position determined through other mechanisms such as GPS.

The communication function comprises communicating data among the phased array radar systems 100 using the same millimeter wave signals as are used for the radar function. Such data may include, for example, pixel or voxel data (and time and position metadata) generated using the radar and positioning functions.

Through a combination of the radar function, the positioning function, and the communication function, the phased array radar systems 100 are operable to generate a scene representation (e.g., 2D pixel grid or 3D voxel grid) where the absolute time of capture of the scene representation and the absolute position of the pixels (2D) or voxels (3D) in the scene representation are known.

The circuitry 410 represents other circuitry of the automobile 400 such as one or more transceivers (e.g., cellular, Wi-Fi, Bluetooth, GPS, etc.), instrumentation (e.g., entertainment system, driver indicators/gauges, driver controls), sensors for safety systems, etc. The circuitry 410 may be communicatively coupled to the phased array radar systems 100 via a CANbus, for example. The circuitry 410 may be operable to process data from the phased array systems $100_1$-$100_8$ and take action (e.g., trigger driver alerts, transmit messages via one or more of its transceivers, trigger braking or other safety systems, etc.) in response to such data. The circuitry 410 may also generate data which it may pass to the phased array systems $100_1$-$100_8$ for communication to a remote phased array radar system 100 (e.g., that is mounted to another automobile and/or to infrastructure such the road, sign post, stop-light, etc.) In an example implementation, the circuitry 410 may comprise a cell phone that connects to an electronics system of the automobile 400 via USB, Bluetooth, Wi-Fi, or any other suitable interface and then the electronics system 410 of the automobile 400 leverages the cellular transceiver of the circuitry 410 for connecting to a cellular network.

Figure 4C:
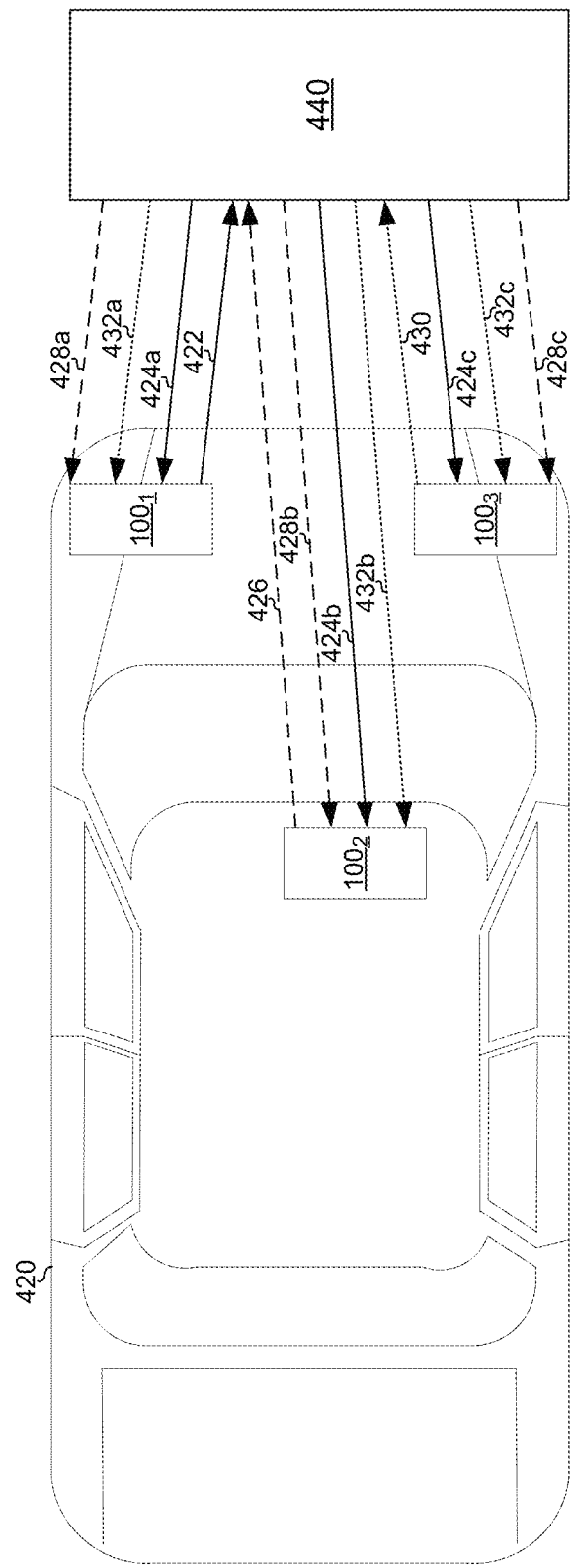
FIG. 4C shows example operation of a phased array radar system in accordance with an example implementation of this disclosure.

FIG. 4C shows example operation of a phased array radar system. The radar system $100_1$ transmits millimeter wave signal 422 which reflects off of object 440 (e.g., the car in front of the automobile 400) and is then received as signal 424a by radar system $100_1$, signal 424b by radar system $100_2$, and signal 424c by radar system $100_3$. The radar system $100_2$ transmits millimeter wave signal 426 which reflects off of object 440 and is then received as signal 428a by radar system $100_1$, as signal 428b by transceiver $100_2$, and as signal 428c by radar system $100_3$. The radar system $100_3$ transmits signal 430 which reflects off of object 440 and is then received as signal 432a by radar system $100_1$, as signal 432b by radar system $100_2$, and as signal 432c by radar system $100_3$.

As discussed above, each of the radar systems $100_1$, $100_2$, and $100_3$ may be operable to separate its respective received signals. That is, radar system $100_1$ can distinguish between energy of signal 424a, energy of signal 428a, and energy of signal 432a. Similar can be said for each of radar systems $100_2$ and $100_3$. This separation may be possible because, for example, the signals 422, 426, and 430 are frequency division multiplexed, time division multiplexed, spatially multiplexed, and/or code division multiplexed. Coordination for carrying out such multiplexing may be achieved as a result of, for example: factory settings of the three radar systems $100_1$, $100_2$, and $100_3$; passing control/coordination information among the radar systems $100_1$, $100_2$, and $100_3$ via the data bus 202; passing control/coordination information among the radar systems $100_1$, $100_2$, and $100_3$ via the millimeter wave signals 422, 426, 430, and/or the like.

FIG. 5A shows an example OFDM frame transmitted by a phased array radar system in accordance with an example implementation of this disclosure. For any given burst (frame), a phased array radar system in accordance with this disclosure may transmit on one or more of a plurality of subbands 504 (twenty-four subbands were chosen arbitrarily for illustration, any number may be used). On each of the subbands $504_1$-$504_{24}$ may be a continuous wave or a modulated data signal (e.g., a N-QAM symbol corresponding to log 2(N) bits of the data signal). Different subbands and/or groups of subbands may be allocated for different purposes (e.g., some for radar, some for positioning, and some for communication). Similarly, using frequency-domain beamforming, signals on different subbands and/or groups of subbands may be pointed in different directions for detecting objects at different locations in the scene and/or for transmitting the data signal in different directions (e.g., pointed at different reflection paths leading to different ones of the transceivers $111_1$-$111_8$).

Data modulated onto the millimeter wave signal may be forward error correction encoded for robustness. Data modulated onto the millimeter wave signal may be scrambled or encrypted for security (e.g., to prevent spoofing, sniffing of communications, etc.).

Figure 5B:
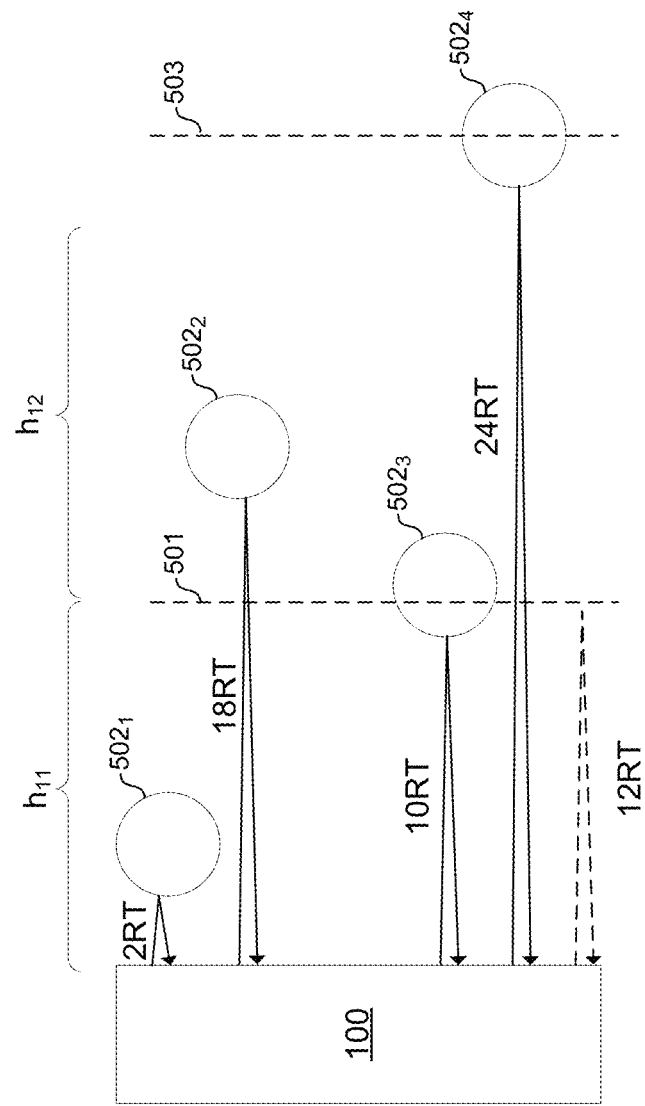
FIG. 5B shows an example scene in which a phased array radar system operates.

FIG. 5B shows an example scene in which a phased array radar system operates. The scene is at a direction D1 relative to the phased array radar system 100 and comprises four objects $502_1$-$502_4$ (each of which may be an automobile, a pedestrian, debris, or any other object on a roadway, for example). For simplicity of illustration, the distances between the phased array radar system 100 and the object $502_1$-$502_4$ has been normalized to multiples of 1 roundtrip time ("RT"). The scene is also split at a distance corresponding to 12RT, as will be discussed further below. The channel response of the scene in direction D1 at distances from 0 to 12RT is denoted $h_{12}$. The channel response of the scene in direction D1 at distances from 12RT to 24RT is denoted $h_{12}$. The number of objects and the distances to the objects have been chosen arbitrarily for illustration. The number of sections into which the scene is split (two in the example), and the length of each section have been chosen arbitrarily for illustration. In other embodiments the scene may be split into fewer or more sections and the lengths of the sections may be equal (as shown) or unequal.

FIG. 5C shows the channel response of the scene of FIG. 5B.

Figure 5D:
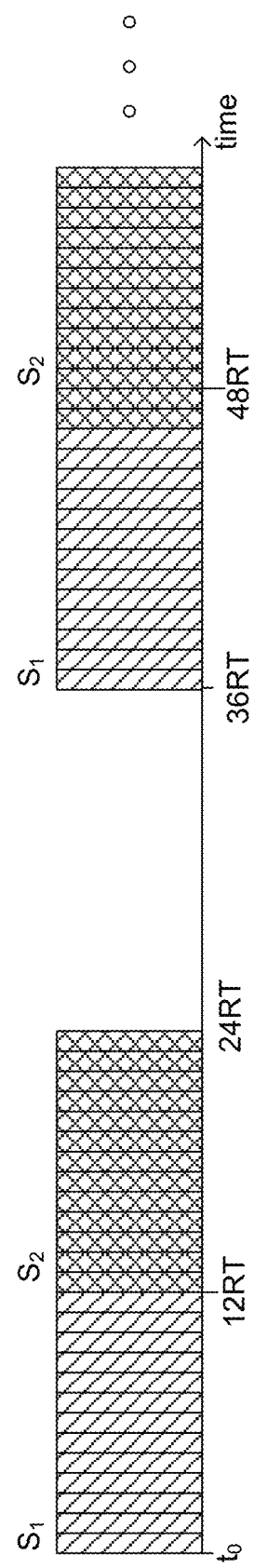
FIG. 5D shows an example signal structure for a phased array radar system in accordance with an example implementation of this disclosure.

FIG. 5D shows an example signal structure for detecting the scene of FIG. 5B. The transmit signal is split into four intervals, which is equal to two times the number of sections into which the scene has been split. In other implementations, the ratio of signal intervals to number of scene sections may be greater or less than two. In an example implementation, the duration of the interval of the signal is determined based on the lengths of the sections of the scene. In the example implementation shown, the first and third intervals are equal to the duration of the first section of the scene (12RT), and the second and fourth intervals are equal to the duration of the second section of the scene (also 12RT in the example shown). The selection of signal intervals in this manner enables generating estimates of $h_{11}$ and $h_{12}$ and iteratively improving those estimates, as further described below with reference to FIG. 5F.

In the example shown, a first OFDM symbol, $S_1$, is repeatedly transmitted during the first interval, a second OFDM symbol, $S_2$, is repeatedly transmitted during the second interval, and then the transmitter is silent during the third interval. This signaling enables generating estimates of $h_{11}$ and $h_{12}$ and iteratively improving those estimates, as further described below with reference to FIG. 5F.

FIG. 5E illustrates the radar returns of the signal of FIG. 5D transmitted into the scene of FIG. 5B. As shown, reflections of $S_1$ from object $502_1$ arrive from 2RT to 14RT; reflections of $S_1$ from object $502_3$ arrive from time 10RT to time 22RT; reflections of $S_1$ from object $502_2$ arrive from time 18RT to time 30RT; reflections of $S_1$ from object $502_4$ arrive from time 24RT to time 36RT; reflections of $S_2$ off of object $302_1$ arrive from time 14RT to time 26RT; reflections of $S_2$ off of object $502_3$ arrive from time 22RT to time 34RT; reflections of $S_2$ off of object $502_2$ arrive from time 30RT to time 42RT; and reflections of $S_2$ off of object $503_4$ arrive from time 36RT to time 48RT.

Figure 5F:
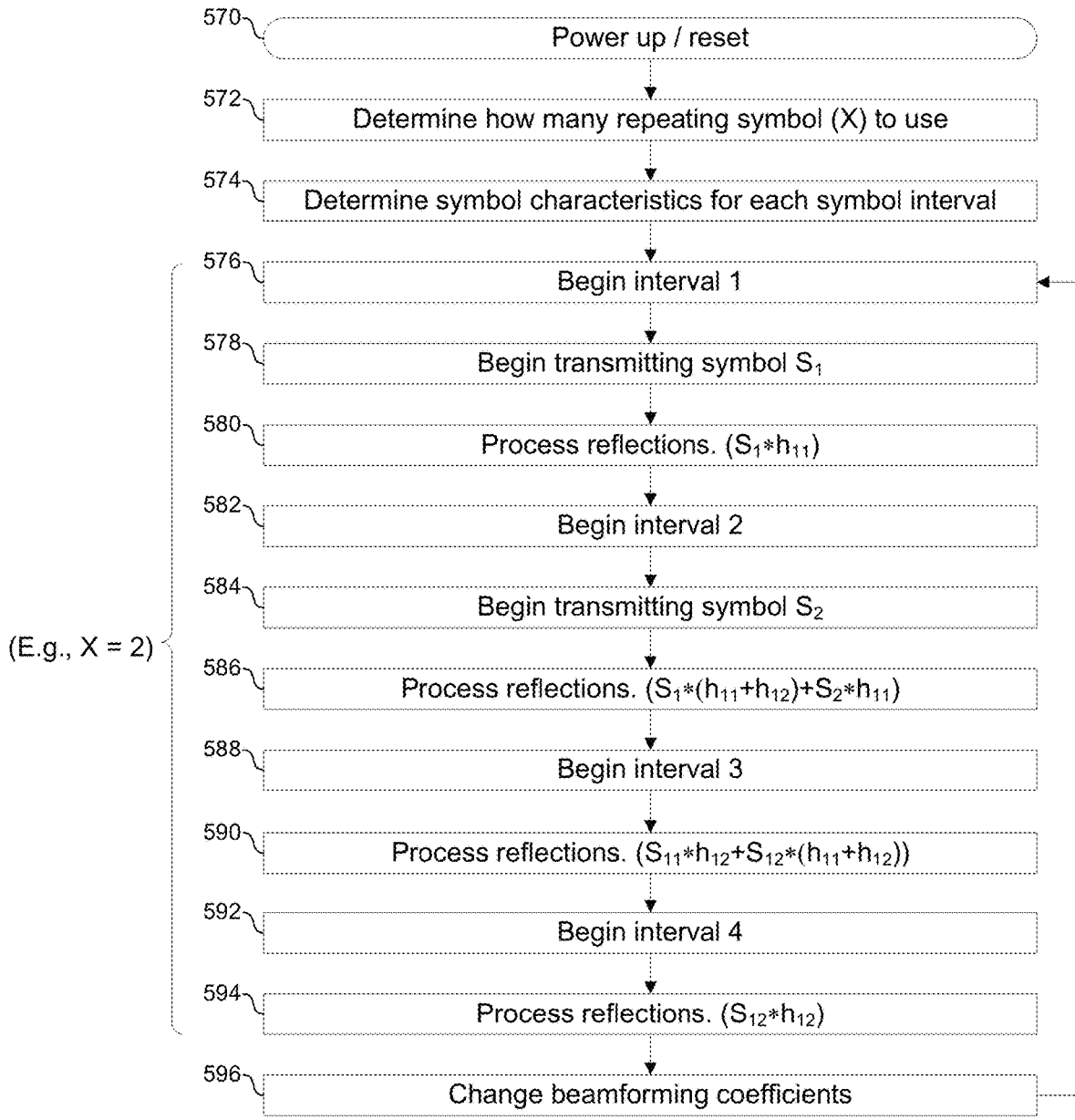
FIG. 5F is a flowchart illustrating operation of a phased array radar system in accordance with an example implementation of this disclosure.

FIG. 5F is a flowchart illustrating operation of a phased array radar system in accordance with an example implementation of this disclosure.

In block 570, a phase array radar system 100 is powered up and/or reset.

In block 572, the radar system 100 determines how many (denoted by integer X) repeating symbols to transmit for scene detection. The system may determine the value of X based on, for example: the speed at which the radar system 100 is moving (e.g., where it is mounted in a vehicle); scene representations generated in a previous time interval (e.g., the system 100 may use more or fewer symbols based on number, proximity, speed, type, and/or other characteristics of objects detected in the scene during the previous time interval). In the example implementations described in with respect to FIGS. 5B-5F, two repeating symbols are used (i.e., X=2).

In block 572, phased array radar system 100 determines characteristics of each of the repeating symbols to be transmitted. Such characteristics may include, for example, number of subcarriers in each of the OFDM symbols, spacing of the subcarriers of each of the OFDM symbols, bandwidth of each the OFDM symbols, symbol constellation used to modulate the subcarriers of the OFDM symbol, transmit power of the OFDM symbol, and/or the like. Uniform characteristics may be chosen for each of the repeating symbols, or different characteristics may be used for different ones of the repeating symbols. In an example implementation, different characteristics may be used for different transmissions of the same symbol (e.g., symbol $S_1$ may have first characteristics when it is transmitted at time $t_0$ and may have second characteristics when transmitted at time $t_4$).

In block 576, time interval 1 (corresponding to, for example, the interval from $t_0$ to 12RT in FIGS. 5C-5E) begins.

In block 578, phased array radar system 100 begins transmitting the first repeating symbol, denoted $S_1$.

In block 580, phased array radar system 100 receives and processes reflections of $S_1$ from the portion of the scene corresponding to $h_{11}$. Thus, the reflections during time interval 1 are equal to the convolution of $S_1$ with the channel response $h_{11}$ (i.e., $S_1*h_{11}$). Thus, since $S_1$ is known, the receiver can process the reflections to generate an estimate of $h_{11}$.

In block 582, time interval 2 (corresponding to, for example, the interval from 12RT to 24RT in FIGS. 5C-5E) begins.

In block 584, the phased array radar system 100 begins transmitting the second of the repeating symbols, denoted $S_2$ (transmission of $S_1$ ceased prior to time interval 2).

In block 586, phased array radar system 100 receives and processes reflections. During time interval 2, the reflections correspond to reflections of $S_1$ from the portions of the scene corresponding to $h_{11}$ and $h_{12}$, and reflections of $S_2$ from portions of the scene corresponding to $h_{11}$. Thus, the reflections during time interval 2 can be represented as $S_1*(h_{11}+h_{12})+S_2*h_{11}$. Thus, the receiver can use the known symbols $S_1$ and $S_2$, along with the previously-generated estimate of $h_{11}$, to improve the estimate of $h_{11}$ as well as generate an initial estimate of $h_{12}$.

In block 588, time interval 3 (corresponding to, for example, the interval from 24RT to 36RT in FIGS. 5C-5E) begins, and the phased array radar system 100 ceases transmitting symbols.

In block 590, phased array radar system 100 receives and processes reflections. During time interval 3, the reflections correspond to reflections of $S_1$ from the portions of the scene corresponding to $h_{12}$, and reflections of $S_2$ from portions of the scene corresponding to $h_{11}$ and $h_{12}$. Thus, the reflections during time interval 3 can be represented as $S_1*h_{12}+S_2*(h_{11}+h_{12})$. Thus, the receiver can use the known symbols $S_1$ and $S_2$, along with the estimates of $h_{11}$ and $h_{12}$, to improve the estimates of $h_{11}$ and $h_{12}$.

In block 592, time interval 4 (corresponding to, for example, the interval from 36RT to 48RT in FIGS. 5C-5E) begins.

In block 594, phased array radar system 100 receives and processes reflections. During time interval 4, the reflections correspond to reflections of $S_2$ from the portions of the scene corresponding to $h_{12}$. Thus, the reflections during time interval 4 can be represented as $S_2*h_{12}$. Thus, the receiver can use the known symbol $S_2$, along with the previous estimate of $h_{11}$ and $h_{12}$, to improve the estimates of $h_{11}$ and $h_{12}$.

In block 596, the phased array system 100 changes the beamforming coefficients to change the direction at which it transmits and/or receives and then the process of transmitting the repeating symbols repeats by returning to block 576. In this manner, each cycle through time intervals 1 through 4 may correspond to determining the scene in a particular direction. That is, the phased array radar system 100 may sweep through a range of Y (an integer) angles in Y cycles of time intervals 1 through 4. The Y scene representations generated corresponding to the Y angles may then be combined to generate a single overall scene representation. Each of the N transceivers $110_n$ may generate such a scene representation and then convey its scene representation to one of the N transceivers designated as an aggregating node. The aggregating Node then combines the N scene representations and conveys it to the host system (e.g., computing system 410 of an automobile 400 to which the phased array radar system 100 is mounted).

While the present disclosure specifically addresses aspects of the invention in connection with an automobile, the disclosure contemplates that aspects of the invention may be used in connection with any type of vehicle or mobile machinery.

In accordance with an example implementation of this disclosure, a transmitter (e.g., portions of $110_n$) of a radar system (e.g., 100) repeatedly transmits a first OFDM symbol (e.g., $S_1$) into a scene (e.g., the scene in direction D1) to be characterized during a first time interval (e.g., $t_0$ to 12RT), and repeatedly transmits, during a second time interval (e.g., 12RT to 24RT) that occurs after the first time interval, a second OFDM symbol (e.g., $S_2$) into the scene. A receiver (e.g., portions of $110_n$) of the radar system generates a first channel response (e.g., $h_{11}$) estimate for a first section of the scene based on: received reflections of the first symbol, at least one of which was received during transmission of the second OFDM symbol in the second time interval, and a first channel response (e.g., $h_{12}$) estimate for a second section of the scene based on the first channel response estimate for the first section of the scene, received reflections of the first symbol, and received reflections of the second symbol. The receiver detects objects present in the scene based on the first channel response estimate for the first section of the scene and the first channel response estimate for the second section of the scene. The receiver may generate, during a third time interval (e.g., 36RT to 48RT) after the second time interval, a second channel estimate for the first section and a second channel estimate for the second section based on the first channel response estimate for the first section of the scene, the first channel response estimate for the second section of the scene, received reflections of the first symbol, and received reflections of the second symbol. During a fourth time interval (e.g., 48RT to 60RT) after the third time interval, the transmitter may repeatedly transmit the first OFDM symbol into the scene. The first section of the scene may be between the radar system and a first boundary (e.g., 501), and the section of the scene may be between the first boundary and a second boundary (e.g., 503) that is farther from the radar system than the first boundary. The radar system may determine the duration of the first time interval based on the length of the first section of the scene (e.g., the radar system may set the duration of the first time interval to be the round trip travel time of the first section of the scene).

In accordance with an example implementation of this disclosure, a radar system may decide a boundary (e.g., 501) of a first section of a scene to be characterized and a boundary (e.g., 503) of a second section of the scene to be characterized, wherein the deciding the boundary of the first section and the boundary of the second section is based on a first characteristic (e.g., speed relative to the radar system, distance between the object and the radar system, etc.) of an object in the scene. The radar system also decides a quantity of OFDM symbols to repeatedly transmit into the scene, wherein the deciding the quantity of OFDM symbols is based on a second characteristic of an object in the scene (which may be the same as or different than the first characteristic). A transmitter of the radar system repeatedly transmits a first of the OFDM symbols (e.g., $S_1$) into the scene during a first time interval (e.g., $t_0$ to 12RT) and repeatedly transmits a second of the OFDM symbols (e.g., $S_2$) into the scene during a second time interval (e.g., 12RT to 24RT). A receiver of the radar system may generate a channel response (e.g., $h_{11}$) estimate for the first section of the scene and a channel response (e.g., $h_{12}$) estimate for a second section of the scene based on received reflections of the first of the OFDM symbols and the second of the OFDM symbols. The receiver also detects objects (e.g., $502_1$-$502_4$) present in the scene based on the channel response estimate for the first section of the scene and the channel response estimate for the second section of the scene. The radar system may set duration of the first time interval based on length of the first section of the scene. The duration may be set to be the round trip travel time of the first section of the scene. The generating the channel response estimate for the first section of the scene may be based on: a reflection of the first symbol received during transmission of the second OFDM symbol in the second time interval. The generating the channel response estimate for the second section of the scene may be based on the channel response estimate for the first section of the scene, received reflections of the first symbol, and received reflections of the second symbol.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, "microwave" frequencies range from approximately 300 MHz to 300 GHz and "millimeter wave" frequencies range from approximately 30 GHz to 300 GHz. Thus, the "microwave" band includes the "millimeter wave" band.

What is claimed is:

1. A method comprising:
    repeatedly transmitting, by a transmitter of a radar system during a first time interval, a first OFDM symbol into a scene to be characterized;
    repeatedly transmitting, by the transmitter of the radar system during a second time interval that occurs after the first time interval, a second OFDM symbol into the scene;
    generating, by a receiver of the radar system, a first channel response estimate for a first section of the scene based on: received reflections of the first OFDM symbol, at least one of which was received during transmission of the second OFDM symbol in the second time interval; and
    generating, by the receiver of the radar system, a first channel response estimate for a second section of the scene based on:
        the first channel response estimate for the first section of the scene;
        received reflections of the first OFDM symbol; and
        received reflections of the second OFDM symbol; and
    detecting, by the receiver of the radar system, objects present in the scene based on the first channel response estimate for the first section of the scene and the first channel response estimate for the second section of the scene.

2. The method of claim 1, comprising during a third time interval after the second time interval, generating, by the receiver of the radar system, a second channel estimate for the first section and a second channel estimate for the second section based on:
    the first channel response estimate for the first section of the scene;
    the first channel response estimate for the second section of the scene;
    received reflections of the first OFDM symbol; and
    received reflections of the second OFDM symbol.

3. The method of claim 2, comprising during a fourth time interval after the third time interval, repeatedly transmitting, by the transmitter of the radar system, the first OFDM symbol into the scene.

4. The method of claim 1, wherein:
    the first section of the scene is between the radar system and a first boundary; and
    the second section of the scene is between the first boundary and a second boundary that is farther from the radar system than the first boundary.

5. The method of claim 4, comprising setting, by the radar system, duration of the first time interval based on length of the first section of the scene.

6. The method of claim 5, comprising setting duration of the first time interval to be a round trip travel time of the first section of the scene.

7. A method comprising:
    deciding, by radar system, a boundary of a first section of a scene to be characterized and a boundary of a second section of the scene to be characterized, wherein:
        the boundary of the second section is farther than the boundary of the first section; and
        the deciding the boundary of the first section and the boundary of the second section is based on a first characteristic of an object in the scene;
    deciding, by the radar system, a quantity of OFDM symbols to repeatedly transmit into the scene, wherein:
        the deciding the quantity of OFDM symbols is based on a second characteristic of an object in the scene; and
        the second characteristic is the same as or different than the first characteristic,
    repeatedly transmitting, by a transmitter of the radar system, a first of the OFDM symbols into the scene during a first time interval;
    repeatedly transmitting, by the transmitter of the radar system, a second of the OFDM symbols into the scene during a second time interval;
    generating, by a receiver of the radar system, a channel response estimate for the first section of the scene and a channel response estimate for a second section of the scene based on received reflections of the first of the OFDM symbols and the second of the OFDM symbols; and
    detect, by the receiver of the radar system, objects present in the scene based on the channel response estimate for the first section of the scene and the channel response estimate for the second section of the scene.

8. The method of claim 7, wherein the first characteristic of the object is one of speed and proximity of the object.

9. The method of claim 7, wherein the second characteristic of the object is one of speed and proximity of the object.

10. The method of claim 7, comprising setting, by the radar system, duration of the first time interval based on length of the first section of the scene.

11. The method of claim 10, comprising setting the duration of the first time interval to be round trip travel time of the first section of the scene.

12. The method of claim 7, wherein the generating the channel response estimate for the first section of the scene is based on: a reflection of the first symbol received during transmission of the second OFDM symbol in the second time interval.

13. The method of claim 12, wherein the generating the channel response estimate for the second section of the scene is based on:
the channel response estimate for the first section of the scene;
received reflections of the first symbol; and
received reflections of the second symbol.

14. A system comprising:
a radar system comprising a transmitter and a receiver, wherein:
the radar system is operable to decide a boundary of a first section of a scene to be characterized and a boundary of a second section of the scene to be characterized;
the boundary of the second section is farther than the boundary of the first section; and
the decision of the boundary of the first section and the boundary of the second section is based on a first characteristic of an object in the scene;
the radar system is operable to decide a quantity of OFDM symbols to repeatedly transmit into the scene, wherein:
the decision of the quantity of OFDM symbols is based on a second characteristic of an object in the scene; and
the second characteristic is the same as or different than the first characteristic,
the transmitter is operable to:
repeatedly transmit a first of the OFDM symbols into the scene during a first time interval;
repeatedly transmit a second of the OFDM symbols into the scene during a second time interval;
the receiver is operable to:
generate a channel response estimate for the first section of the scene and a channel response estimate for a second section of the scene based on received reflections of the first of the OFDM symbols and the second of the OFDM symbols; and
detect objects present in the scene based on the channel response estimate for the first section of the scene and the channel response estimate for the second section of the scene.

15. The system of claim 14, wherein the first characteristic of the object is one of speed and proximity of the object.

16. The system of claim 15, wherein the second characteristic of the object is one of speed and proximity of the object.

17. The system of claim 16, wherein the radar system is operable to set a duration of the first time interval based on length of the first section of the scene.

18. The system of claim 14, wherein the radar system is operable to set duration of the first time interval to be round trip travel time of the first section of the scene.

19. The system of claim 14, wherein the generation of the channel response estimate for the first section of the scene is based on: a reflection of the first OFDM symbol received during transmission of the second OFDM symbol in the second time interval.

20. The system of claim 19, wherein the generation of the channel response estimate for the second section of the scene is based on:
the channel response estimate for the first section of the scene;
received reflections of the first OFDM symbol; and
received reflections of the second OFDM symbol.

* * * * *